Feb. 12, 1924.
F. A. LEERS
1,483,182
VAULT LIGHT
Filed May 31, 1923
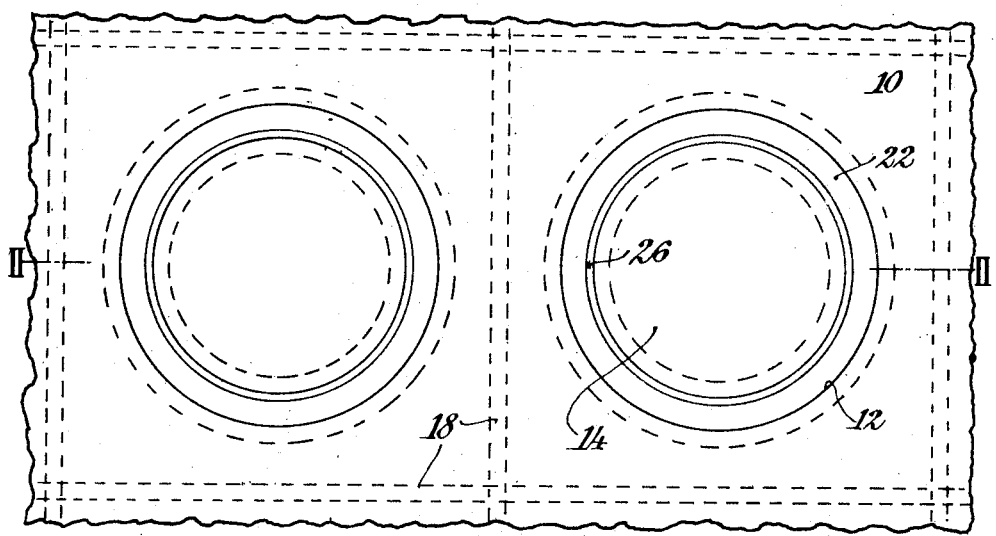
Fig.1.
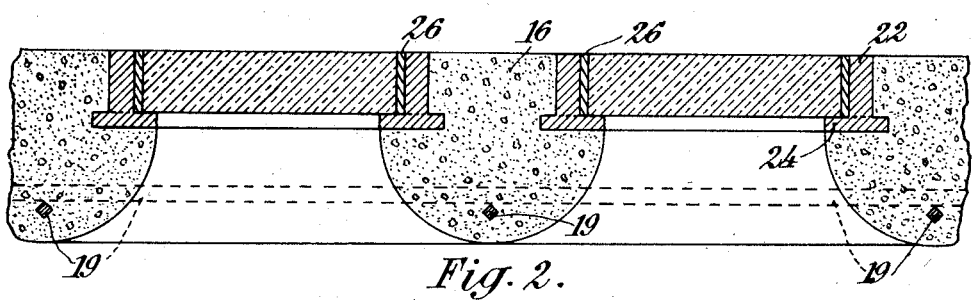
Fig. 2.
Fig. 3.
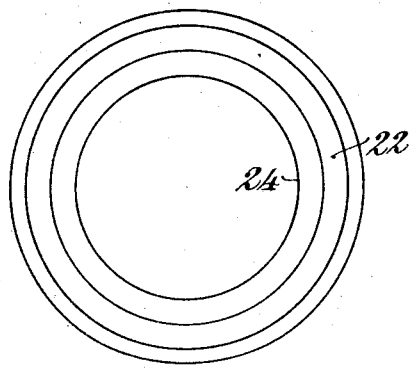
Fig. 4.
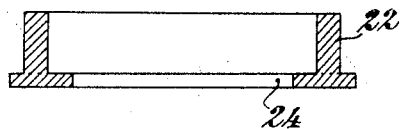
INVENTOR:
Frank A. Leers
By Attorneys,
Fraser Myers & Manley Patented Feb. 12, 1924.

1,483,182

UNITED STATES PATENT OFFICE.

FRANK ADOLPH LEERS, OF BOGOTA, NEW JERSEY.

VAULT LIGHT.

Application filed May 31, 1923. Serial No. 642,526.

*To all whom it may concern:*

Be it known that I, FRANK ADOLPH LEERS, a citizen of the United States of America, and residing in Bogota, in the county of Bergen and State of New Jersey, have invented certain new and useful Improvements in Vault Lights, of which the following is a specification.

This invention relates to glazed gratings, commonly known as vault lights, and ordinarily used for lighting vaults and passages under pavements and sidewalks, areas beneath roofs, and the like, and aims to provide improvements therein.

It is a matter of general observation, at least in climates having severe winters, that a large amount of cracking of the glass lenses or lights used in these gratings occurs over a winter season. This not only interferes with the weather tightness of the grating, but disfigures the grating, reduces the amount of light transmitted to the space below, and contributes to the rapid destruction of the whole grating structure, especially where this is of concrete.

It is therefore the purpose of the present invention to provide a structure in which the injurious effects of weathering, as described above, are very largely, if not entirely, avoided, and a satisfactory vault light or grating as regards avoidance of the damage to the lenses by the weather thereby obtained.

Vault lights are ordinarily constructed by setting or sealing the lights or lenses in a slab of concrete, or in a cast-iron or pressed sheet iron plate. These materials have different (larger) coefficients of expansion than glass (concrete and iron or steel having about the same coefficients of expansion), the result being that the surrounding material, on cooling, tends to contract more than the glass, and the contraction of the surrounding material being consequently restrained by the glass, said material exerts pressure on the glass to equalize the strain or deformation set up in the material, and thus produces or contributes to the fracture of the glass. It is believed that this unequal expansion of the glass lenses and the material surrounding them is the underlying cause of the cracking of the lenses, and that if the glass lens can be protected from the pressure exerted by the surrounding medium on cooling, that the breaking of the lenses will be largely if not entirely avoided.

Cast iron rings and frames have been used to surround the openings in concrete gratings, and to receive the lenses, and a plastic has also been used to fill in between the lenses and the grating, and between lenses and rings or frames, but these expedients do not appear to have solved the problem of preventing breakage of the lenses. This may be explained by the fact that the cast iron rings and frames have higher coefficients of expansion than the glass, and hence do not protect it from stress, in fact contribute toward its stress, and that the plastic becomes more or less rigid at low temperatures, and hence becomes a medium for transmitting and imparting stresses to the glass.

According to the present invention, it is proposed to interpose around the lens between the glass lens and the grating structure a frame or ring of suitable material, having a less coefficient of expansion than the lens, which frame or ring resists the stresses transmitted from the grating structure, and relieves, in whole or in part, the lenses from such transmitted stresses, and thus prevents or materially reduces the breakage of such lenses.

An embodiment of the invention is illustrated in the accompanying drawings, in which—

Figure 1 is a top plan view of part of a grating structure provided with lights or lenses.

Fig. 2 is a cross-sectional view on the line II—II, Fig. 1.

Figs. 3 and 4 are respectively a top plan view and a cross-sectional view of a frame or ring which is interposed between the lens and the grating structure, for protecting said lens from the stress exerted by said grating structure.

Referring to said drawings, numeral 10 designates a grating of any usual construction, having openings 12, in which are set lenses or lights 14 for closing said openings to the weather, but transmitting light whereby the space below said grating may be lighted or illuminated.

As here shown, the grating 10 is of the reinforced concrete type, consisting of concrete 16 having embedded therein a lattice 18 of metal reinforcing bars 19, this being the form of grating for vault lights most widely in use, and to which the present invention is especially applicable. Such a reinforced concrete grating structure has a coefficient of expansion of around .000 006 to .000 008 inches per inch per degree F.

In the openings 12 there are arranged frames or rings 22 of a material having a coefficient of expansion less than that of the lenses 14, the value of which latter may range from .000 003 3–.000 005 per degree F. These frames or rings may be of either a rigid or a plastic nature. It is preferred, however, to use a rigid frame or ring, as a porcelain ring, porcelain having a coefficient of expansion of .000 002 per degree F, or a frame or ring made of a special nickle-steel, as Invar, having a coefficient of expansion of less than .000 001 per degree F. Where the grating structure 10 is of concrete, the frames or rings 22 are preferably incorporated therein at the time of forming the grating structure.

Where a glass lens is placed in such a frame or ring as described having a less coefficient of expansion than the lens, the glass of the lens, on cooling, tends to contract away from the frame or ring. The concrete (or other material of which the grating is formed) having a greater coefficient of expansion than the frame or ring, presses in on the ring, but when the frame or ring comes in contact with the glass, due to the pressure exerted on it by the grating structure, the stress set up by the concrete or other material of the grating structure, on its contraction being restrained, has been equalized or opposed by the strain set up in the frame or ring, and the lens is left free from stress, or with stress thereon materially reduced. Thereby, breaking of the lenses, due to temperature changes, is avoided or materially reduced.

The frames or rings 22 may be formed with flanges 24, adapted to support the lenses at their lower sides. The frames or rings 22 may be of any suitable or convenient shape, though a round or substantially round shape is most suitable for uniformly resisting the external stresses arising from the contraction of the grating material.

It is preferred to make the lenses 14 of slightly smaller size or diameter than the inside of the frame or ring 22, and to fill the space between the frame or ring 22 and lens with mastic, or other suitable plastic material 26, as this provides a convenient means of making a weather-tight joint and further serves to avoid excessive pressure of the lens outwardly on the ring by expansion under high summer temperatures.

The invention may receive other embodiments than that herein specifically illustrated and described.

What is claimed is:

1. A vault light comprising a grating structure, lights or lenses adapted to set in the openings in said grating structure, and rings or frames in said openings between said grating structure and said lenses, having a less coefficient of expansion with temperature than that of said lenses, adapted to relieve said lenses from contraction stresses exerted by said grating structure due to temperature changes.

2. A vault light comprising a grating structure, lights or lenses adapted to set in the openings in said grating structure, and rings or frames in said openings between said grating structure and said lenses, having a less coefficient of expansion with temperature than that of said lenses, adapted to relieve said lenses from contraction stresses exerted by said grating structure due to temperature changes, and a filling of plastic material between said lenses and rings or frames.

3. A vault light comprising a grating structure, lights or lenses adapted to set in the openings in said grating structure, and rings or frames in said openings between said grating structure and said lenses, having a less coefficient of expansion with temperature than that of said lenses, adapted to relieve said lenses from contraction stresses exerted by said grating structure due to temperature changes, said rings and lenses being of circular outline.

4. A vault light comprising a grating structure, lights or lenses adapted to set in the openings in said grating structure, and rings or frames in said openings between said grating structure and said lenses, having a less coefficient of expansion with temperature than that of said lenses, adapted to relieve said lenses from contraction stresses exerted by said grating structure due to temperature changes, said grating structure being of concrete and said rings or frames being embedded in said concrete.

5. A vault light comprising a grating structure, lights or lenses adapted to set in the openings in said grating structure, and rings or frames in said openings between said grating structure and said lenses, having a less coefficient of expansion than that of said lenses, adapted to relieve said lenses from contraction stresses exerted by said grating structure due to temperature changes, said rings or frames being of porcelain.

In witness whereof, I have hereunto signed my name.

FRANK ADOLPH LEERS.